(12) United States Patent
Sabella et al.

(10) Patent No.: US 9,036,624 B2
(45) Date of Patent: May 19, 2015

(54) METHOD OF SCHEDULING TRANSMISSION IN A COMMUNICATION NETWORK, CORRESPONDING COMMUNICATION NODE AND COMPUTER PROGRAM PRODUCT

(75) Inventors: Dario Sabella, Turin (IT); Marco Caretti, Turin (IT); Matteo Maria Andreozzi, Pisa (IT); Giovanni Stea, Pisa (IT)

(73) Assignee: Telecom Italia S.p.A., Milan (IT)

( * ) Notice: Subject to any disclaimer, the term of this patent is extended or adjusted under 35 U.S.C. 154(b) by 99 days.

(21) Appl. No.: 13/518,778

(22) PCT Filed: Dec. 24, 2009

(86) PCT No.: PCT/EP2009/009266
§ 371 (c)(1),
(2), (4) Date: Jun. 22, 2012

(87) PCT Pub. No.: WO2011/076239
PCT Pub. Date: Jun. 30, 2011

(65) Prior Publication Data
US 2012/0250678 A1 Oct. 4, 2012

(51) Int. Cl.
*H04L 12/823* (2013.01)
*H04L 12/875* (2013.01)
(Continued)

(52) U.S. Cl.
CPC .............. *H04L 47/564* (2013.01); *H04L 47/10* (2013.01); *H04L 47/127* (2013.01); *H04L 47/283* (2013.01); *H04L 47/32* (2013.01)

(58) Field of Classification Search
CPC ................ H04L 49/90; H04L 12/5693; H04L 2012/6489; H04L 47/28; H04L 43/0852; H04L 47/10; H04L 47/127; H04L 47/283; H04L 47/32; H04L 47/564; H04J 3/0632

USPC ................. 370/229, 235, 389, 412, 465, 516; 709/224
See application file for complete search history.

(56) References Cited

U.S. PATENT DOCUMENTS 6,259,677 B1 * 7/2001 Jain ................................ 370/252
6,512,761 B1 * 1/2003 Schuster et al. .............. 370/352
(Continued)

FOREIGN PATENT DOCUMENTS

JP 2009-147459 A 7/2009
WO 2008/059000 A1 5/2008
(Continued)

OTHER PUBLICATIONS

Rosenberg et al., "Integrating FEC into Adaptive Voice Playout Buffer Algorithms on the Internet", Mar. 26-30, 2000, IEEE, IEEE Infocom 2000, pp. 1705-1714.*
(Continued)

*Primary Examiner* — Gary Mui
*Assistant Examiner* — Michael Phillips
(74) *Attorney, Agent, or Firm* — Banner & Witcoff, Ltd.

(57) ABSTRACT

Data streams are transmitted from a node towards a receiver in a communication network in the form of data packets for playout via a reproduction buffer at the receiver. The data packets are arranged in a scheduling queue and dropped from the scheduling queue if their sojourn time in the queue exceeds a given drop deadline. The reproduction buffer is emulated at the node in order to determine respective playout values for the data packets which are indicative of expected playout instants for the data packets by the reproduction buffer at the receiver. The drop deadlines are assigned to the data packets as a function of the respective playout values determined via the reproduction buffer as emulated at the node.

20 Claims, 2 Drawing Sheets

(51) Int. Cl.
*H04L 12/801* (2013.01)
*H04L 12/841* (2013.01)

(56) References Cited

U.S. PATENT DOCUMENTS

| | | | | |
|---|---|---|---|---|
| 6,965,597 | B1* | 11/2005 | Conway | 370/389 |
| 7,051,246 | B2* | 5/2006 | Benesty | 714/700 |
| 2002/0057686 | A1* | 5/2002 | Leon | 370/389 |
| 2003/0112758 | A1* | 6/2003 | Pang et al. | 370/235 |
| 2003/0115320 | A1* | 6/2003 | Yarroll et al. | 709/224 |
| 2004/0057381 | A1* | 3/2004 | Tseng et al. | 370/238 |
| 2004/0066751 | A1* | 4/2004 | Tseng et al. | 370/252 |
| 2006/0023871 | A1* | 2/2006 | Shaffer et al. | 379/420.01 |
| 2006/0045138 | A1* | 3/2006 | Black et al. | 370/516 |
| 2006/0203822 | A1* | 9/2006 | Lee et al. | 370/394 |
| 2007/0047515 | A1* | 3/2007 | Jonsson et al. | 370/352 |
| 2008/0008096 | A1* | 1/2008 | Dhanapal et al. | 370/235 |
| 2008/0165766 | A1 | 7/2008 | Synnergren | |
| 2008/0243495 | A1* | 10/2008 | Anandakumar et al. | 704/214 |
| 2008/0267224 | A1* | 10/2008 | Kapoor et al. | 370/516 |
| 2009/0109965 | A1* | 4/2009 | Matthews | 370/356 |
| 2009/0190575 | A1 | 7/2009 | Fukuyama et al. | |
| 2009/0254654 | A1* | 10/2009 | Jakob et al. | 709/224 |
| 2010/0040077 | A1* | 2/2010 | Maze et al. | 370/412 |
| 2010/0172357 | A1* | 7/2010 | Poulin et al. | 370/395.4 |
| 2010/0284397 | A1* | 11/2010 | Poulin et al. | 370/352 |
| 2012/0008641 | A1* | 1/2012 | Stoica et al. | 370/465 |

FOREIGN PATENT DOCUMENTS

| | | | |
|---|---|---|---|
| WO | 2009/077852 | A1 | 6/2009 |
| WO | WO 2009/109069 | * | 9/2009 |

OTHER PUBLICATIONS

International Search Report mailed May 7, 2010, PCT/EP2009/009266.

Matteo Maria Andreozzi; Giovanni Stea; Andrea Bacioccola; Roberto Rossi, "Flexible scheduling for Real-Time services in High-Speed Packet Access cellular networks", Wireless Conference, 2009. EW 2009. European, 20090517 IEEE, Piscataway, NJ, USA—ISBN 978-1-4244-5935-3 ; ISBN 1-4244-5935-4, pp. 189-193, XP031583298.

Morton Editor ATOEB_AMPamp A C; USA T, "Revised text of G.1020 adding RTCP-XR parameters and other clarifications; D 168", ITU-T Draft Study Period 2005-2008, International Telecommunication Union, Geneva; CH, Jun. 5, 2006, Vol: Study Group 12, pp. 1-33, XP017406229.

Luigi Atzori; Mirko L Lobina, "Playout buffering in ip telephony: a survey discussing problems and approaches", IEEE Communications Surveys, 20060701 IEEE, New York, NY, US—ISSN 1553-877X, vol. 8, No. 3, pp. 36-46, XP011144707.

A. Bacioccola, C. Cicconetti, and G. Stea; Oct. 22, 2007, "User-level performance evaluation of VoIP using ns-2", In Proceedings of the 2nd international conference on Performance evaluation methodologies and tools (ValueTools '07), ICST (Institute for Computer Sciences, Social-Informatics and Telecommunications Engineering), ICST, Brussels, Belgium, Belgium, Article 20,10 pages, ISBN: 978-963-9799-00-4, XP002578866.

Recommendation ITU-T G.107 (Apr. 2009), The E-model: a computational model for use in transmission planning, Series G: Transmission Systems and Media, Digital Systems and Networks International telephone connections and circuits—Transmission planning and the E-model, 24 pages.

Z. Qiao, L Sun, N. Heilemann, and E Ifeachor, "A new method for VoIP quality of service control use combined adaptive sender rate and priority marking", IEEE ICC 2004, Paris, France, Jun. 20-24, 2004, pp. 1473-1477.

Kentarou Fukuda, Naoki Wakamiya, Masayuki Murata, and Hideo Miyahara, "QoS control method for real-time MPEG-2 video transfer with consideration for resource availability," Technical Report of IEICE IN98-105, The Institute of Electrics, Information and Communication Engineers, Oct. 16, 1998, vol. 98, No. 329, pp. 13-20.

JP Notice of Reason for Rejection mailed Oct. 1, 2013, JP Appln. 2012-545100, English translation only.

CN Notification of the First Office Action mailed Mar. 5, 2014, CN Appln. 200980163071.0, English translation.

\* cited by examiner

METHOD OF SCHEDULING TRANSMISSION IN A COMMUNICATION NETWORK, CORRESPONDING COMMUNICATION NODE AND COMPUTER PROGRAM PRODUCT

CROSS REFERENCE TO RELATED APPLICATIONS

This is a U.S. National Phase Application under 35 U.S.C. §371 of International Application No. PCT/EP2009/009266, filed Dec. 24, 2009, which was published Under PCT Article 21(2), the entire contents of which are incorporated herein by reference.

FIELD OF THE INVENTION

This disclosure relates to techniques for scheduling data transmission in communication networks.

This disclosure has been developed with attention paid to its possible use in scheduling data packets of a Voice over IP (VoIP) data stream in a point-to-multipoint communication node.

DESCRIPTION OF THE RELATED ART

The Internet has originally been designed having in mind reliable packet transfer. In fact, all the lower layers of the protocol stack include mechanisms for guaranteeing reliable communication, such as sequence numbers, timeouts, checksums (such as Cyclic Redundancy Check), Forward Error Correction (FEC), Automatic Repeat request (ARQ), etc. This is due to the Internet being initially conceived as a computer data network, wherein correctness and integrity of computer data are key attributes.

Nowadays, the Internet is well established as a global, multi-service infrastructure, providing an ever-growing support for real-time services. Packetized voice, such as Voice over IP (VoIP), is among the most important emerging real-time applications for the Internet, acting as a major driver for the deployment of advanced Quality of Service (QoS) solutions.

Despite the massive presence of real-time traffic, for which timeliness is as important as integrity, few Quality-of-Service (QoS) solutions actually use time as a parameter for taking decisions, except at an application level. This is probably due to the historically well-known problem of clock synchronization across the Internet, which makes it difficult to have globally synchronized clocks at two remote points.

The lack of reliable clock synchronization is often a problem for performance measurement, where long measurement intervals (days to weeks) and high precision are required (thus making even small clock skews extremely harmful).

Progresses in clock synchronization are currently being made, which enable to achieve sub-millisecond accuracy in such a long term. However, voice conversations last for minutes to a few hours, and synchronization errors in the order of few milliseconds hardly generate any noticeable effect in human perception.

The accuracy required for keeping clocks synchronized for a couple of hours with up to few milliseconds of absolute difference is already achievable at little cost with available techniques, such as from Global Position System (GPS) chips, which are inexpensive and already mounted in most portable devices, the same result being achieved also by proprietary solutions available in the Universal Mobile Telecommunications. System (UMTS) network (where much tighter synchronization is indeed a major requirement) or the well-known Network Time Protocol.

FIG. 1 schematically represents a typical VoIP scenario in which two users U1 and U2 communicate via two user terminals UE1 and UE2 which are connected to a common network N (e.g. the internet).

At the sender side (i.e. UE1), the first component is an encoder 100, which periodically samples the voice signal of the first user U1 (i.e. the speaker). A wide variety of encoders are available, representing different trade-off points in the balance between quality and bandwidth consumption. Typically, encoders are either sample-based or frame-based. The former encoders (e.g., based on the G.711 codec) encode individual speech samples periodically, while the latter encoders (e.g., based on the G.729 codec) group a certain number of samples within a time window (i.e., a frame) of some milliseconds. For that reason, frame-based encoders often achieve higher compression rates and smaller data rates, though their encoding/decoding complexity is usually higher.

The generation of speech frames can either occur at periodic intervals, or, more commonly, be modulated by Voice Activity Detection (VAD). VAD capitalizes on the natural alternation of talkspurt and silence periods in a single (unidirectional) stream of a bi-directional conversation. During silence periods, either no speech frames are produced at all, or they are produced at a reduced rate and/or using a reduced number of bits, so as to convey some comfort noise to the listener. Comfort noise permits a conversation party to feel the liveliness of the other one, and can be generated also locally. For instance, the G.711 codec usually generates 172-byte packets during talkspurts and does not send any information during silence periods. On the other hand, the Global System for Mobile Communications (GSM) Adaptive Multi-Rate (AMR) codec normally generates 31-byte payload packets during talkspurts, and either 0-byte synchronization information or 5-byte comfort noise packets during silence periods.

A number of speech frames may also be multiplexed into the same packet payload by means of a multiplexer 102, so as to reduce the overhead of transport, network and Media Access Control (MAC) headers, though at the expense of increasing the transmission delay. This can also be done to increase the level of redundancy, so as to conceal losses. The level of speech multiplexing may also vary over time, according to network conditions.

Finally, the VoIP payload is encapsulated into data packets, such as RTP/UDP/IP packets, i.e. packets being communicated at the application layer via the Real-time Transport Protocol (RTP), at the transport layer via the User Datagram Protocol (UDP), and at the internet layer via the Internet Protocol (IP).

At the receiver side (i.e. in the terminal UE2), speech frames are de-multiplexed by means of a de-multiplexer 104 and fed into a playout buffer 106. The playout buffer 106 causes speech frames to be decoded at the same interval at which they were generated by the encoder. For that reason, it may be necessary to re-order, delay or even drop speech frames if they arrive after their expected playback time.

Playout buffers may be fixed or adaptive. Fixed buffers assume the network delay to be constant during a conversation, and therefore delay the first packet of a talkspurt of a fixed amount of time. Adaptive buffers, endeavor to dynamically adapt the playback point to the changing network conditions, normally on a per-talkspurt basis (although some may also vary the playout delay within a talkspurt, at the risk of generating spurious frequency effects).

The playout buffer delivers speech frames to a decoder 108, which actually playbacks them to the user U2 (i.e. the listener). Some decoders may implement Packet Loss Concealment (PLC) techniques, which allow missing speech frames to be somewhat reconstructed by interpolating surrounding frames that were received correctly. While PLC techniques can mask only a limited number of losses, they effectively reduce the impairment due to loss as perceived by a listener.

The evaluation of VoIP conversational quality has been the subject of extensive investigation. The most widely used evaluation framework for VoIP is the so-called E-model, standardized by Telecommunication Standardization Sector (ITU-T) of the International Telecommunication Union (ITU). This evaluation framework involves computing a predictive estimation of the subjective quality of the packetized voice from transmission parameters.

The output of an E-model computation is a scalar number, called the "R factor", computed as a function of delays, packet loss, equipment impairment factors, and user quality call expectation:

$$R = R_0 - I_s - I_d - I_{e,eff} + A \quad (1)$$

wherein $R_0$ is the basic signal-to-noise ratio (received speech level relative to circuit and acoustic noise), $I_s$ accounts for the impairments which occur with the voice signal, $I_d$ sums all impairments due to delay and echo effects, $I_{e,eff}$ is the effective equipment impairment factor, taking into account the codec and its tolerance to random packet losses.

Furthermore, A is a "bonus" factor that models the user expectation of the technology employed. For instance, the value of A is greater in satellite networks than in classical circuit-switched networks, because user expectations in satellite networks are lower than those in wired networks. The typical range for the A factor is [0, 20] and exemplary values as proposed by the ITU are reported in the following table:

| Communication System | A factor |
| --- | --- |
| Wired phone | 0 |
| Cellular in building | 5 |
| Cellular in moving vehicle | 10 |
| Access to hard-to-reach geographical zones (many satellite hops) | 20 |

Finally, $I_{e,eff}$ can be computed as:

$$I_{e,eff} = I_e + (95 - I_e) \cdot P_{pl}(P_{pl} + B_{pl}) \quad (2)$$

where $I_e$ is an equipment impairment factor, which is used to characterize the behaviors of the codec with a low bit rate, $P_{pl}$ is the packet loss probability, and $B_{pl}$ is the codec packet loss robustness factor.

Once an R factor has been obtained, it may be mapped directly to an estimated Mean Opinion Score (MOS). For example, the specification ITU-T G107 (ITU-T Recommendation G.107 (04-2009), "The E-model, a computational model for use in transmission planning") describes a possible relationship between the R factor and the estimated MOS. The Mean Opinion Score may thus be used to improve Quality of Experience (QoE) or QoS solutions. Usually such optimizations are performed at the application level, where QoE may be measured.

For example, the article from L. Atzori, M. L. Lobina, and M. Corona, "Playout buffering of speech packets based on a quality maximization approach", IEEE Transactions on Multimedia, Vol. 8 No. 2, pages 420-426, 2006, proposes the use of an optimal playout buffer at the receiver in order to predict the playout delay for an incoming talkspurt. Specifically, the playout instant for the next talkspurt is set to the one that would have maximized the quality of the last N talkspurts.

Also, the article from A. Bacioccola, C. Cicconetti, and G. Stea, "User level performance evaluation of VoIP using ns-2", Proceedings of NSTOOLS'07, First International Workshop on Network Simulation Tools, Nantes (FR), Oct. 22, 2007, describes a possible optimal playback algorithm.

Z. Qiao, L. Sun, N. Heilemann, and E. Ifeachor, "A new method for VoIP quality of service control use combined adaptive sender rate and priority marking", IEEE ICC 2004, Paris, France, June 20-24, pages 1473-1477, propose a QoS control scheme to adapt the rate of a GSM AMR codec to adapt the sending rate to the current network conditions. The adaptation is based on the MOS measured by the VoIP decoder, which reports feedback information to the VoIP encoder via Real-Time Control Protocol (RTCP) messages.

OBJECT AND SUMMARY OF THE INVENTION

The inventors have noted that the optimization of QoE at an application level based on feedback information has several drawbacks. For example, such feedback-based techniques make the application unduly complex, and either require synchronization or rely on round-trip times, which are not symmetric and therefore are much less accurate than one-way delays.

The need is therefore felt for improved solutions that may dispense with such drawbacks, and may permit effective allocation of network resources, e.g. in scheduling downlink voice flows in a centralized (wired or wireless) point-to-multipoint network.

According to the present invention, this may be achieved by a method having the features set forth in the claims that follow. The invention also relates to a corresponding communication node, as well as a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is intended to highlight the possibility for the present invention to be implemented in a distributed/modular fashion.

The claims are an integral part of the disclosure of the invention provided herein.

Various embodiments described herein may be used to schedule the transmission of data streams from a communication node (e.g. a basestation) towards a receiver (e.g. a mobile terminal), wherein the data packets are intended for playout via a reproduction buffer at the receiver.

In various embodiments, the data packets are arranged in the node in a scheduling queue and dropped from the scheduling queue if their sojourn time in the queue exceeds a given drop deadline.

In various embodiments, the reproduction buffer of the receiver is emulated at the node in order to determine respective expected playout instants for the data packets. Subsequently, the drop deadlines of the data packets are assigned to the data packets as a function of the respective expected playout instants determined via the reproduction buffer as emulated at the node.

Various embodiments are applicable to several access technologies, such as to cellular networks including UMTS Long Term Evolution (LTE) or High-Speed Downlink Packet Access (HSDPA).

Various embodiments rely on the recognition that in these cellular network technologies, absolute time is usually known via out-of-band network synchronization procedures.

Various embodiments are also applicable in broadband wireless networks with centralized control at the MAC level, such as 802.11e Hybrid Coordination Function (HCF) Centralized Control Access (HCCA), 802.16, or TDMA systems (e.g., 802.11 WLANs with tweaked TDMA drivers), when an absolute time reference is added.

Various embodiments are also applicable to wired networks, where a central switch sends data packets to clients.

Various embodiments rely on the recognition that the Mean Opinion Score (MOS) may be used directly at a communication network level.

Various embodiments are applied to downlink flows, which rely on a prediction of the (loss and delay) behavior of the downstream segment of the end-to-end path (therein including the application part).

Various embodiments involve taking scheduling decisions in a cross-layer approach, based on (absolute) timestamps, e.g. in the form of RTP timestamps, which have been introduced in the data-packets at the data source. Such absolute timestamps may be derived with various means, including GPS synchronization, UMTS network synchronization, network protocols and/or time servers.

Various embodiments exploit the absolute time for scheduling downlink flows in a point-to-multipoint network (e.g., an LTE or UMTS cell, or a TDMA network), i.e. a communication network wherein the network resources are shared among a plurality of users or terminals.

The exemplary embodiments described herein primarily refer to downlink voice flows, where:
  there exists a well-established means to estimate the (subjective) quality perceived by the user from (objective) end-to-end network-level measurements, such as loss and delay, i.e. the E-Model or Mean Opinion Score (MOS); and
  the behavior of a voice application at the receiver side (specifically, its playout buffering mechanism) is fairly predictable, so that it is possible to infer the (non negligible) contribution of the voice receiver to loss and delay.

Those of skill in the art will appreciate that various embodiments may also be applied to other real-time traffic streams, such as video streams. For that purpose a framework similar to the E-Model for video traces can be developed.

In various embodiments, each packet is assigned a deadline equal to the presumed or expected playback instant; by so doing, late packets, i.e. those which would be dropped at the receiver, may be dropped directly at the scheduler, thus saving bandwidth and optimizing the network resource allocation.

In various embodiments, the scheduler may also delay early packets until their actual playback point without affecting user perception, thus increasing the chance that packets with tighter deadlines may be delivered to the receiver in time.

In various embodiments, the playback point at the receiver is estimated by emulating for the connection a simplified receiver and/or playout buffer ("reproduction buffer").

For example, in the case of a VoIP stream, also a simplified adaptive playout buffer may be emulated, i.e. a buffer whose playback point is varied dynamically for each talkspurt. For example, at the end of a talkspurt, computations allow to infer the optimal-a-posteriori playback instant, i.e. the one which would have guaranteed the highest MOS for that talkspurt. The history of those optimal playback instants may then be used to infer the new presumed playback instant for the subsequent talkspurt.

In various embodiments, in order to compute the optimal playback instants a posteriori, the E-Model formulas are used. These take into account mouth-to-ear delay, which can be computed if the packet generation and (presumed) playback times may be determined based on clock synchronization. For that reasons, packets may be timestamped at the source applications with absolute times sampled from an accurate clock, and the scheduler is aware of the absolute time when packets are delivered at the receiver, again by reading an accurate absolute clock. In various embodiments, the RTP protocol, in particular the RTP timestamp field, is used for that purpose: for example, the RTP header may be read twice per packet, i.e. at packet arrival, when sequence numbers and packet timestamps may be used to compute the packet deadline, and at packet departure, when the scheduler may estimate the mouth-to-ear delay by comparing the wall clock time (i.e. the absolute time when the packet leaves the queue of the scheduler) to the packet timestamp.

The embodiments herein have several advantages, such as:
  they are inexpensive, because the space cost of the reproduction buffer emulation is quite affordable, as the whole implementation framework requires usually less than 100 byte per flow;
  time overhead is negligible, because usually a constant number of operations is required for each flow;
  the most complex computation (i.e., computing the optimal a posteriori playback instant) involves typically just few memory accesses, and may be completed during silence periods, i.e. several hundreds of milliseconds;
  the resulting arrangement is robust: even rather coarse clock errors (in the order of ±10 ms) are tolerated without any appreciable quality degradation, so that temporary loss of synchronization (even for a long time) hardly affects the scheduling process;
  the resulting arrangement may work in conjunction with any deadline-based scheduler, such as the well-known Earliest Due Date (EDD), or for wireless networks with user-dependent and time-dependent channel conditions with a scheduler that takes into account both the deadlines and channel state;
  the framework may be applied to various communication technologies, including i.a. communication scenarios where the following conditions are met:
  a) the packet source and the scheduling node are synchronized (e.g., through GPS),
  b) each packet contains a timestamp,
  c) the scheduling component is able to read the packet timestamps at arrival and the absolute time at their departure, and
  d) the downstream segment of the path only includes a playout buffer plus additional delays that can be measured online (e.g., delay due to H-ARQ retransmissions) and/or estimated (e.g., propagation and processing delays).

Accordingly, various embodiments may be implemented in any access network with a coordinated point-to-multipoint scheduling under the above hypotheses.

BRIEF DESCRIPTION OF THE ANNEXED REPRESENTATIONS

The invention will now be described, by way of example only, with reference to the enclosed representations, wherein:
  FIG. 1 has already been described in the foregoing;

DETAILED DESCRIPTION OF EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
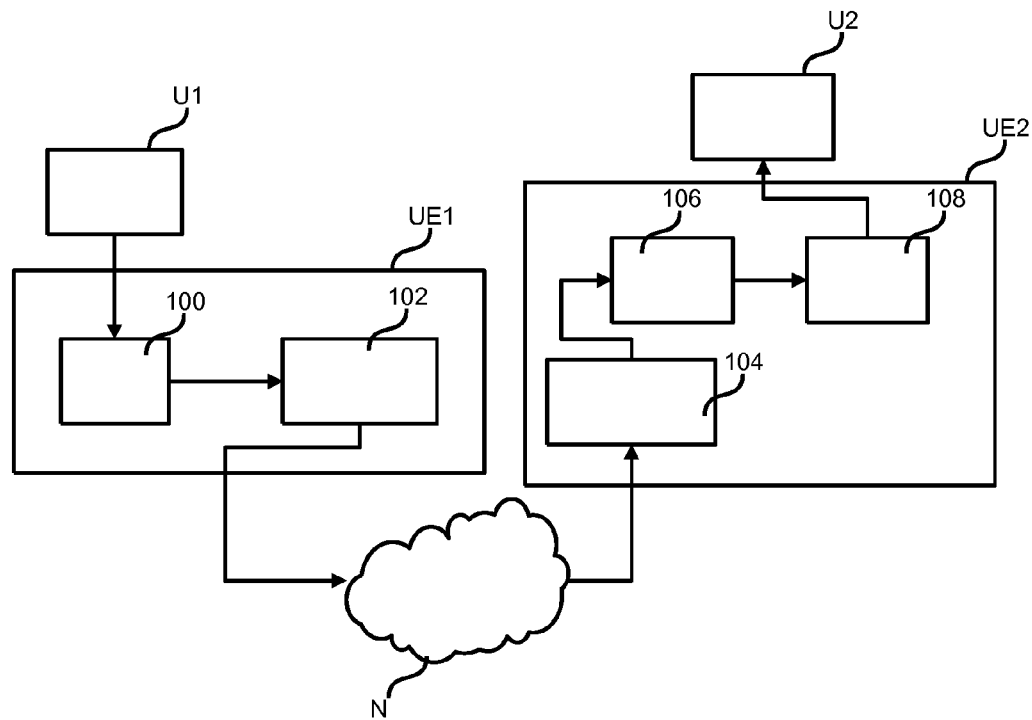
Figure 2:
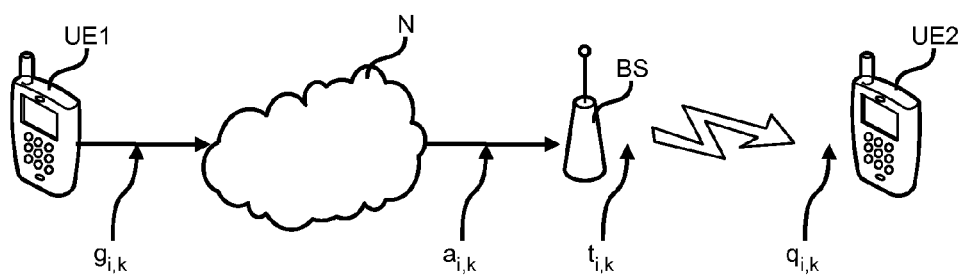
FIG. 2 shows an exemplary communication scenario.

FIG. 2 shows an exemplary embodiment, wherein a voice stream organized in data packets is transmitted between two LTE mobile devices UE1 and UE2 by means of the RTP protocol.

In the embodiment considered, the first mobile device UE1 sends data to a basestation BS (i.e. the eNodeB in a LTE network) with which the mobile device UE2 is associated via a communication network N.

Each data packet may comprise n voice frames and each packet may be transmitted via m Protocol Data Units (PDU). Moreover, the value of m may be different for different connections, and may change over time, e.g. when the feedback from the H-ARQ process indicates that the number of retransmission has significantly increased/decreased. The value of m may also be fixed and preconfigured at setup.

Some simplified assumptions will be made at first in order to facilitate understanding the description; further reading the description will however make it clear that such assumptions are in no way mandatory. Specifically, it will be assumed that each RTP packet comprises only one voice frame, and that voice packets are not fragmented at the eNodeB, so that one PDU carries one voice frame.

In the embodiment considered, packets are timestamped with the frame generation time at creation, wherein $g_{i,k}$ is the generation time of the $k^{th}$ packet in the $i^{th}$ talkspurt, with $i,k \geq 0$, and $a_{i,k}$ is the arrival time at the eNodeB.

Packets may accumulate a variable delay in the network N, and some packets may also be dropped and/or delivered out of sequence.

Figure 3:
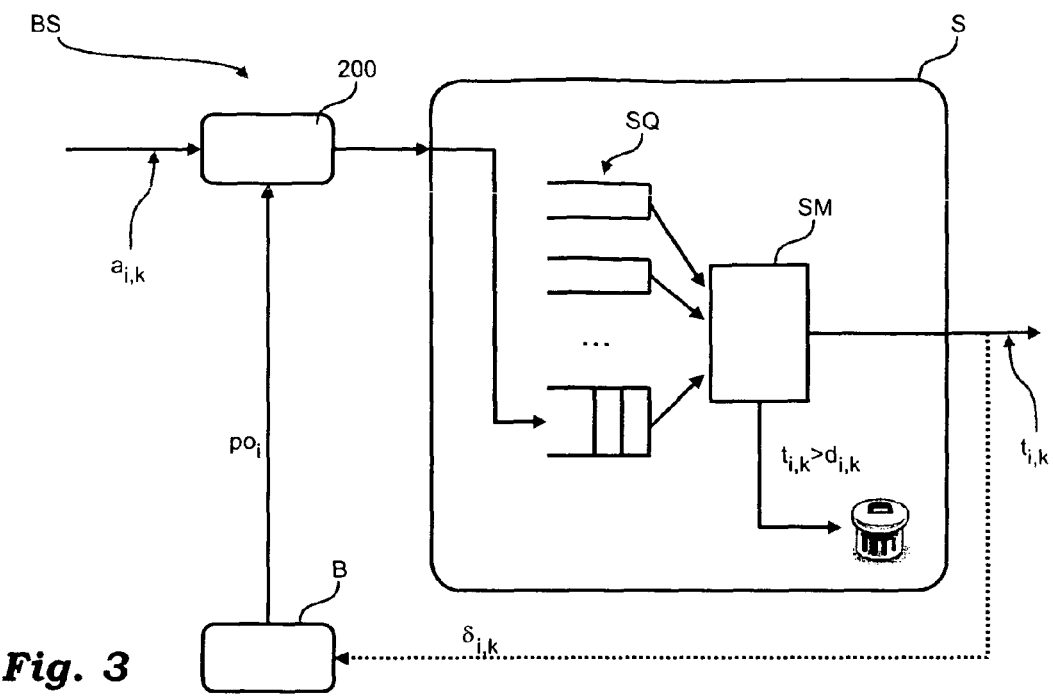
FIG. 3 is a block diagram of an embodiment.

FIG. 3 shows a block diagram of a possible implementation of the basestation BS in accordance with the invention.

In the embodiment considered, when packets arrive at the basestation BS at a time $a_{i,k}$, they are assigned a deadline $d_{i,k}$ at a control module 200.

The packets, coming out from control module 200 with the assigned deadline $d_{i,k}$, are then scheduled by a scheduler S, which may take into account their deadlines so that scheduler S may drop packets if their sojourn time in the eNodeB queue exceeds their deadline $d_{i,k}$, because these packets are likely to be dropped at the receiver buffer, hence transmitting them would just waste radio resources.

In the embodiment considered, the scheduler S comprises a plurality of queues SQ where the data packets of the respective data streams are stored. For instance, the queues SQ may be implemented by means of First-In First-Out (FIFO) memories. Subsequently, a scheduling module SM decides which packet will be transmitted or dropped. For example, in the embodiment considered, a packet will be dropped if the scheduled transmission time of the packet $t_{i,k}$ exceeds the deadline $d_{i,k}$ of the packet, i.e. $t_{i,k} > d_{i,k}$.

In various embodiments, a packet selected for transmission by the scheduler S at time $t_{i,k}$ is taken care of by H-ARQ processes, and, after a measurable delay $dl_{i,k}$, it is available for playout at the mobile device UE2.

In the embodiment considered, the delay $dl_{i,k}$ includes possible H-ARQ retransmissions of that packet and an estimate of the physical delays in the air interface and in the mobile node, which usually are substantially constant.

In various embodiments, the estimated delay dl is set as follows:

$$dl = T_{proc} + T_{OW} + (m-1) \cdot T_{H-ARQ} \quad (3)$$

where $T_{proc}$ represents an estimate of the processing delay at the physical and MAC layers at the receiver, $T_{OW}$ is the time to send a PDU through the downlink segment (i.e., the time it takes from an H-ARQ process to deliver the packet to the receiver, therein excluding the ACK/NACK generation and reporting), $T_{H-ARQ}$ is the time for an H-ARQ transmission cycle and m is the number of transmissions taken into account for a packet.

In addition to the delay $dl_{i,k}$, the only further delay that the packet undergoes before the voice sample is played out at the time $p_{i,k}$ is the one of the playout buffer at the receiver.

Therefore, the arrival time $q_{i,k}$ at the receiver playout buffer is:

$$q_{i,k} = t_{i,k} + dl_{i,k} \quad (4)$$

and the overall network delay of the frame i may be defined as:

$$\delta_{i,k} = q_{i,k} - g_{i,k} \quad (5)$$

In various embodiments, the sequence of $\delta_{i,k}$ is fed as an input to an emulated playout buffer B which allows to determine the deadline $d_{i,k}$. Specifically, the emulated optimal playout buffer B emulates the playout buffer of the mobile device UE2, and its purpose is to identify a posteriori (i.e., once talkspurt i is over) what the optimal playout instant $po_i$ should have been, i.e. the one that would have warranted the highest MOS for that talkspurt.

In the embodiment considered, the deadline $d_{i,k}$ is computed as follows:

$$d_{i,k} = po_i - (a_{i,k} - g_{i,k}) - dl \quad (6)$$

where $po_i$ is the estimated playout delay at the receiver for the $i^{th}$ talkspurt, wherein the playout delay is defined as the interval between the generation and playout time of any successfully played packet in the talkspurt, and dl is the estimate of the delay due to the radio interface and processing at the receiver (other than that generated by its playout buffer).

The history of past optimal playout delays $po_j$, with $0 \leq j \leq i$, is then used to infer the new playout delay $po_{i+1}$ for the incoming talkspurt.

In various embodiments, a non-causal optimal playback algorithm is used. More specifically, in various embodiments, the playout buffer waits for the whole set of frames of a given talkspurt to arrive at the scheduler and be transmitted (or dropped), and then selects the playback delay—based on the pattern of arrivals, transmissions and drops—according to which the best possible speech quality would have been achieved. The purpose of including such an optimal playout buffer is to predict what a clever adaptive playout buffering algorithm would do. For example, this permits to delay early packets and/or to drop packets that have a low chance of being played out.

In various embodiments, the control module 200 and the emulated buffer B are implemented by means of software code portions, which are executed by a processor in the basestation BS. However, the modules may also be implemented in the form of a dedicated digital circuit.

Figure 4:
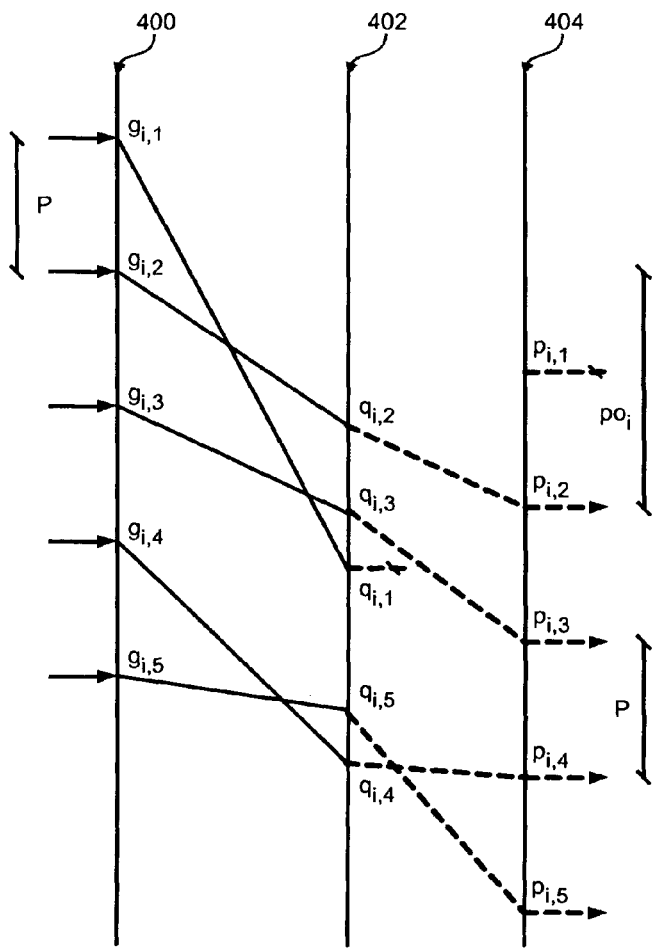
FIG. 4 is a timing diagram of operation of an embodiment.

FIG. 4 shows an exemplary scenario including a transmission phase 400, a buffering phase 402 and a playout phase 404 of a talkspurt with five VoIP frames being generated with equal time difference P at the time instants $g_{i,1}$, $g_{i,2}$, $g_{i,3}$, $g_{i,4}$, and $g_{i,5}$.

In the embodiment considered, the k-th frame of talkspurt i is (virtually) passed to the decoder at the time $p_{i,k}$, i.e. played out, and the playout delay $po_i$ for all the packets in a talkspurt which are actually played are assumed to be constant, i.e., $p_{i,k} - p_{i,j} = g_{i,k} - g_{i,j}$, for each k, j that are actually played.

Without loss of generality, it may be assumed that $q_{i,k} = \infty$ for each frame i that is lost due to the network. Similarly, it may be assumed that the playout buffer of the receiver discards directly all frames that are received too late, i.e. packets with $\delta_{i,k} > po_i$, which implies that all frames with $\delta_{i,k} = q_{i,k} = \infty$ are discarded, regardless of the value of $po_i$. Frames that are discarded by the playout buffer contribute to the loss rate $L_i$, which is defined as the ratio between the number of discarded frames and the number of frames in the talkspurt.

In the example of FIG. 4, $L_i = 1/5$ because all frames but the first one are received "in time".

Therefore, a degree of freedom of the playout buffer B is the playout delay $po_i$.

In various embodiments, an optimal playout delay $po_i^{opt} \in \{\delta_{i,k}\}$ is determined based on a MOS function which considers QoS and/or QoE criteria. For example, in the embodiment considered, the value of $po_i^{opt}$ is calculated as the value of possible playout delays that maximizes the R factor. However, those of skill in the art will appreciate that the actual formula used to compute the optimal playout delay $po_i^{opt}$ may depend on the specific codec used.

In various embodiments, the value $po_i^{opt}$ is calculated by merging equations (1) and (2) described herein, and using for the impairments $I_d$ equation (2) of the article from Atzori et al.:

$$R = R_0 - I_s - [0.024 \cdot po_i + 0.11 \cdot (po_i - 177.3) \cdot 1_{(po_i \geq 177.3)}] - I_e - (95 - I_e) \cdot P_{pl}/(P_{pl} + B_{pl}) + A \quad (7)$$

In various embodiments, the packet loss probability $P_{pl}$ in equation (7) is substitute with:

$$P_{pl} = \frac{\sum_{k=1}^{N_i} 1_{\{\delta_{k,i} > po_i\}}}{N_i} \quad (8)$$

wherein $N_i$ is the number of packets in the i-th talkspurt (which may be measured, e.g., by inspecting the sequence numbers), and the notation $1_{(x)}$ means that the result is 1 if x is true, and otherwise 0. Accordingly, the summation provides the count of packets in the i-th talkspurt that have a delay $\delta_{k,i}$ being larger than $po_i$, i.e. those that were dropped either within the network (i.e. $\delta_{k,i} = +\infty$) or at the playout buffer itself (i.e. $\delta_{k,i} > po_i$).

Accordingly, equation (7) may be written as:

$$R = R_0 - I_s - [0.024 \cdot po_i + 0.11 \cdot (po_i - 177.3) \cdot 1_{\{po_i \geq 177.3\}}] - I_e - (95 - I_e) \cdot \left(\frac{\sum_{k=1}^{N_i} 1_{\{\delta_{k,i} > po_i\}}}{N_i}\right) / \left(\frac{\sum_{k=1}^{N_i} 1_{\{\delta_{k,i} > po_i\}}}{N_i} + B_{pl}\right) + A \quad (9)$$

Those of skill in the art will appreciate that the above equations are just an exemplary implementation, and that other calculations of the R factor may be used. In any case, as already mentioned in the foregoing, $po_i^{opt}$ may be calculated as the value of possible playout delays that maximizes the R factor:

$$\delta_{i,k} > po_i^{opt} = \underset{po_i}{\operatorname{argmax}}\{R\} \quad (10)$$

Usually, the MOS is obtained via a non-increasing function of $po_i$ and $L_i$, and $L_i$ itself is a non-increasing function of $po_i$. Accordingly, there exists an optimal value $po_i^{opt}$ that permits the R factor to be maximized for the talkspurt. For example, such an optimal value $po_i^{opt}$ may be computed through a search in the set of possible network delays in a talkspurt $\{\delta_{i,k}\}$.

Accordingly, the playout buffer is adaptive, since it sets the playback point on a per-talkspurt basis, while it is non-causal, because the delay of all speech frames has to be known before selecting the playback point.

In various embodiments, the optimal playout buffer is used as follows:

after talkspurt i, the optimal playout delay $po_i^{opt}$ is computed, then, an exponential average is used to infer a likely playout delay for the next talkspurt (i+1):

$$po_{i+1} = \alpha \cdot po_i + (1-\alpha) \cdot po_i^{opt}, \text{ with } 0 < \alpha < 1. \quad (11)$$

$po_{i+1}$ is then used to set the deadlines for the packets in the next talkspurt according to equation 6)

Thus, playout instants are selected based on the past history. This leaves the problem of selecting the playout delay for the first talkspurt, since no estimate is available at that time. To overcome this problem, a default value may be selected for the initial value, wherein the initial value may also be based on information regarding the call endpoints. For example, a typical default value for the initial playout delay may be 200 ms. Moreover, also the weight parameter α may be optimized heuristically.

As mentioned in the foregoing, a RTP packet may also include n voice frames, with n≥1.

Various embodiments assume that the RTP timestamp refers to the generation time of either the first (or the last voice frame). In that case, the generation time of each frame may be computed e.g. based on the codec period.

In various embodiments, the packet deadline and discard time (which were assumed to be equal so far) are considered separately. For example, the deadline may be computed based on the generation instant of the first voice frame, while the discard time of the packet may be set to the presumed playout instant of the last voice frame. This means that the packet may be transmitted as long as it still carries some useful content.

Accordingly, when inserting frames in the playout buffer, each frame may be associated to the correct generation time. Furthermore, depending on how large RTP packets are and on how the PDU length is set in the LTE cell, one packet may end up being fragmented into several PDUs at the eNodeB. In this case, all the PDUs may be associated to the same deadline and discard time, and the network delay of the packet may be set based on the transmission time of the last PDUs of a packet.

Due to the fact that the network may drop packets and is not assumed to preserve their sequence, it might be possible that the first packet of a talkspurt i, which arrives at time $a_{i,k_0}$ at the basestation BS is in fact the $k_0^{th}$, with $k_0 \geq 0$.

Accordingly, various embodiments provide for packets to carry sequence numbers. In that way, the scheduler may determine that $k_0$ other packets are missing, independently from their generation time.

In various embodiments, the scheduler computes thus a lower bound on the network delay of the previous packets directly upon arrival of packet $k_0$. These packets will thus inevitably have an earlier deadline than packets already queued in the system.

In various embodiments, the scheduler tries to realign the PDUs. For example, if a packet $k < k_0$ arrives, the associated PDU(s) may be placed in the buffer before later packets.

As this may not be feasible for schedulers using FIFO memories as buffers, the associated PDU(s) may be placed in FIFO order, however with their correct deadline and discard time, computed according to equation (6). In that case, deadlines are non-monotonically increasing for the same flow. However, this will not affect scheduling, and, if later packets are transmitted well before their deadline, there may still be room for transmitting the earlier ones.

The exemplary solution described in the foregoing distinguishes talkspurts. For most—if not all—codecs, the packet generation period is constant, which makes such a task easy. In fact, RTP packets carry both timestamps and sequence numbers. Thus, for those codecs, which do not generate and send any information during silence periods, it is possible to observe that any two packets which arrive consecutively at the basestation BS, carrying sequence numbers $k_1$, $k_2$, and with generation timestamps such that talkspurts ts with $ts(k_2) > ts(k_1) + P \cdot (k_2 - k_1)$ certainly belong to different talkspurts. In practical cases, a safety margin (e.g., one period) may be added to the right-hand side of the above inequality to account for jittery sources.

Conversely, silence periods should be estimated only a posteriori, i.e. when a new talkspurt begins, because a burst of consecutive losses may be mistaken for a silence period.

For those codecs which do send reduced information during silence periods, silence period may be detected immediately by examining the packet size.

Computation of the optimal playout delay may be performed by sorting the network delays, and computing the R factor for each possible network delay. Assuming M packets in a talkspurt, this would lead to a time overhead O(M). Although M may not be expected to be a very large number in practical cases (the average talkspurt length being in the order of 1s), the time overhead may also be limited without relying on this assumption.

For example, the network delays may be quantized at a rather coarse resolution, e.g., 10 ms, which usually does not introduce appreciable quality degradation.

Moreover, instead of storing all possible network delays, a limited number of B+1 integer delay counters may be used.

For example, in various embodiments, the counter l, with $0 \leq l \leq B-1$, is related to a network delay range being equal to $[i \cdot Q + C, (i+1) \cdot Q + C[$, wherein Q is the quantization interval and C is a delay offset which may be set to the fixed delay component along the path if the latter is known (otherwise C may also be set to zero as a safe estimate).

Conversely, the last counter, i.e. the $B^{th}$ counter, may be related to delay range $[B \cdot Q + C, \infty[$.

In that way, whenever a packet arrives at the optimal playout buffer, the related counter may be increased in a constant time, and the cost is reduced to O(B). In fact, when the delay is divided into Q buckets (e.g. buckets having a delay range from 0 to 10 ms, from 11 to 20 ms, from 21 to 30 ms, etc.), an arrival of a packet with a given delay may immediately be associated to the respective bucket. Accordingly, it is not necessary to scan an array of possible delays, but merely a single operation is required. Accordingly, the time required for executing this operation is constant for all possible delays.

For example, in case the quantization interval is set to 10 ms, and the maximum delay is 500 ms, B would be 50, which is rather affordable.

Generally, the bucket delay ranges need not be of the same size, and/or may also vary over time. In fact, progressive delay ranges may be a viable solution, especially for long-range calls.

Furthermore, optimal values of Q and C for a flow may be dynamically estimated by examining the delay distribution as the connection progresses. This may further decrease the amount of operations required to compute the optimal playout delay.

As already stated, the solution described herein may be employed with any scheduler that takes into account deadlines in order to select which PDUs to transmit. For instance, the well-known Earliest Due Date (EDD) algorithm may be used.

In cellular networks, however, where mobility is a key requisite and channel conditions vary fast, advanced schedulers also take into account other information such as a channel quality feedback from the mobile users. For instance, the Hybrid Channel-Aware and Real-Time (HY-CART) scheduler, devised for UMTS High Speed Packet Access, sorts users according to their priority, which is computed by mixing channel and deadline information. In such cases, the role of the solution described herein may provide meaningful deadlines, which also permit to take better decisions directly in the scheduler.

Without prejudice to the underlying principles of the invention, the details and the embodiments may vary, even appreciably, with respect to what has been described by way of example only, without departing from the scope of the invention as defined by the annexed claims.

The invention claimed is:
1. A method comprising:
arranging a plurality of data packets in a scheduling queue at a node in a communication network;
emulating, at the node, a playout buffer of a receiver in the communication network with an emulated reproduction buffer, wherein emulating the playout buffer comprises:
determining an optimal playout delay of a previous data packet played out by the receiver; and
determining a playout value for a first data packet of the plurality of data packets based on the optimal playout delay, wherein the playout value indicates an expected playout time for the first data packet from the playout buffer of the receiver, and wherein the playout value is determined based on a time the first data packet is generated at a sender in the communication network, a time that the first data packet is received at the node, a time that the first data packet is expected to be transmitted from the node to the receiver, and an estimated delay time for transmitting the first data packet from the node to the receiver;

assigning a drop deadline to the first data packet based on the playout value; and dropping the first data packet from the scheduling queue if an amount of time spent by the first data packet in the scheduling queue exceeds the drop deadline.

2. The method of claim 1, wherein the first data packet includes a timestamp that indicates the time that the first data packet is generated at the sender in the communication network.

3. The method of claim 1, wherein:
a first value indicates the time that the first data packet is generated at the sender,
a second value indicates the time that the first data packet is received at the node,
a third value indicates the time that the first data packet is expected to be transmitted from the node to the receiver, and
a fourth value indicates the estimated delay time for transmitting the first data packet from the node to the receiver.

4. The method of claim 1, wherein emulating the playout buffer of the receiver comprises:
emulating the playout buffer at the node as an adaptive playout buffer.

5. The method of claim 1, wherein the playout value is determined based on at least one of a Quality of Service, a Quality of Experience, and a Mean Opinion Score.

6. The method of claim 5, wherein the playout value is determined based on the Mean Opinion Score, and wherein the first data packet is transmitted over a Voice over IP data stream, and wherein the Mean Opinion Score is calculated by an E-Model.

7. The method of claim 1, wherein the first data packet is transmitted over a Voice over IP data stream, wherein a first talkspurt includes the previous data packet, wherein the optimal playout delay comprises an optimal playout delay of the first talkspurt, wherein a second talkspurt includes the first data packet, and wherein the playout value indicates the expected playout time for data packets of the second talkspurt occurring after the first talkspurt.

8. The method of claim 1, wherein the playout value is determined based on an exponential average that takes into account previous values for the playout value.

9. The method of claim 1, wherein assigning the drop deadline to the first data packet based on the playout value comprises:
assigning the drop deadline to the first data packet such that the first data packet is dropped if an expected transmission time of the first data packet exceeds the expected playout time.

10. The method of claim 1, wherein the node in the communication network comprises a basestation, and wherein the method further comprises:
prior to arranging the plurality of data packets in the scheduling queue at the basestation, receiving, at the basestation, the plurality of data packets including the first data packet; and
sending the first data packet from the basestation to the receiver if the amount of time spent by the first data packet in the scheduling queue does not exceed the drop deadline.

11. An apparatus comprising:
a processor; and
memory storing computer-executable instructions that, when executed by the processor, cause the apparatus to:
arrange a plurality of data packets in a scheduling queue;
emulate a playout buffer of a receiver in a communication network with an emulated reproduction buffer, wherein emulating the playout buffer comprises:
determining an optimal playout delay of a previous data packet played out by the receiver; and
determining a playout value for a first data packet of the plurality of data packets based on the optimal playout delay, wherein the playout value indicates an expected playout time for the first data packet from the playout buffer of the receiver, and wherein the playout value is determined based on a time the first data packet is generated at a sender in the communication network, a time that the first data packet is received at the apparatus, a time that the first data packet is expected to be transmitted from the apparatus to the receiver, and an estimated delay time for transmitting the first data packet from the apparatus to the receiver; and
drop the first data packet from the scheduling queue if an amount of time spent by the first data packet in the scheduling queue exceeds a drop deadline.

12. The apparatus of claim 11, wherein the apparatus comprises at least one of a Universal Mobile Telecommunications System Long Term Evolution communication node and a High-Speed Downlink Packet Access communication node.

13. The apparatus of claim 11, wherein the memory stores additional computer-executable instructions that, when executed by the processor, cause the apparatus to assign the drop deadline to the first data packet based on the playout value.

14. The apparatus of claim 13, wherein assigning the drop deadline to the first data packet based on the playout value comprises:
assigning the drop deadline to the first data packet such that the first data packet is dropped if an expected transmission time of the first data packet exceeds the expected playout time.

15. The apparatus of claim 11, wherein the first data packet includes a timestamp that indicates the time that the first data packet is generated at the sender in the communication network.

16. The apparatus of claim 11, wherein:
a first value indicates the time that the first data packet is generated at the sender,
a second value indicates the time that the first data packet is received at the apparatus,
a third value indicates the time that the first data packet is expected to be transmitted from the apparatus to the receiver, and
a fourth value indicates the estimated delay time for transmitting the first data packet from the apparatus to the receiver.

17. A non-transitory computer readable medium having software code portions stored thereon that, when executed by at least one computer, perform the steps of:
arranging a plurality of data packets in a scheduling queue at a node in a communication network;
emulating, at the node, a playout buffer of a receiver in the communication network with an emulated reproduction buffer, wherein emulating the playout buffer comprises:
determining an optimal playout delay of a previous data packet played out by the receiver; and
determining a playout value for a first data packet of the plurality of data packets based on the optimal playout delay, wherein the playout value indicates an expected playout time for the first data packet from the playout buffer of the receiver, and wherein the playout value is determined based on a time the first data packet is generated at a sender in the communication network, a time that the first data packet is received at the node, a time that the first data packet is expected to be transmitted from the node to the receiver, and an estimated delay time for transmitting the first data packet from the node to the receiver;

assigning a drop deadline to the first data packet based on the playout value; and dropping the first data packet from the scheduling queue if an amount of time spent by the first data packet in the scheduling queue exceeds the drop deadline.

18. The non-transitory computer readable medium of claim 17, wherein the assigning the drop deadline to the first data packet based on the playout value comprises:

assigning the drop deadline to the first data packet such that the first data packet is dropped if an expected transmission time of the first data packet exceeds the expected playout time.

19. The non-transitory computer readable medium of claim 17, wherein the first data packet includes a timestamp that indicates the time that the first data packet is generated at the sender in the communication network.

20. The non-transitory computer readable medium of claim 17, wherein:

a first value indicates the time that the first data packet is generated at the sender, a second value indicates the time that the first data packet is received at the node, a third value indicates the time that the first data packet is expected to be transmitted from the node to the receiver, and a fourth value indicates the estimated delay time for transmitting the first data packet from the node to the receiver.

* * * * *